United States Patent [19]
Martone et al.

[11] Patent Number: 5,727,847
[45] Date of Patent: Mar. 17, 1998

[54] LINEAR ACTUATOR

[75] Inventors: Michael A. Martone; Tyrone R. Secord, both of Troy, Mich.

[73] Assignee: Maple Automotive Innovations, Inc., Troy, Mich.

[21] Appl. No.: 807,711

[22] Filed: Feb. 28, 1997

Related U.S. Application Data

[63] Continuation-in-part of Ser. No. 609,342, Mar. 1, 1996, Pat. No. 5,618,083.

[51] Int. Cl.⁶ .................................................. B60N 2/20
[52] U.S. Cl. .................................. 297/375; 297/378.11
[58] Field of Search ........................ 297/375, 362.12, 297/361.1, 378.11; 248/424

[56] References Cited

U.S. PATENT DOCUMENTS

| | | |
|---|---|---|
| 3,216,766 | 11/1965 | Tabor et al. . |
| 4,372,612 | 2/1983 | Wiers et al. . |
| 4,438,974 | 3/1984 | Kresky et al. ............ 297/378.11 |
| 4,457,406 | 7/1984 | Porter . |
| 4,591,207 | 5/1986 | Nithammer et al. . |
| 4,781,415 | 11/1988 | Heesch et al. . |
| 5,052,752 | 10/1991 | Robinson . |
| 5,423,598 | 6/1995 | Lane, Jr. et al. ............ 297/479 |
| 5,452,941 | 9/1995 | Halse et al. ............ 297/480 |

FOREIGN PATENT DOCUMENTS

| | | |
|---|---|---|
| 1466417 | 12/1966 | France . |
| 2041064 | 9/1980 | United Kingdom . |
| 2044341 | 10/1980 | United Kingdom ............ 297/378.11 |

*Primary Examiner*—Peter M. Cuomo
*Assistant Examiner*—David E. Allred
*Attorney, Agent, or Firm*—Gifford, Krass, Groh, Sprinkle, Patmore, Anderson & Citkowski, P.C.

[57] ABSTRACT

A linear actuator is used in an adjustable seat back recliner mechanism to provide infinitely adjustable operation. The actuator rod is maintained in its locked position by the contact of a lower friction surface of the rod with a friction surface on a lower clamp member. Upper clamp members are further seated against an upper surface of the actuator rod. When a sudden force is applied such as in a vehicle collision, an inertial locking element is swung upwardly into contact with the actuator rod to positively lock the actuator rod to the body of the actuator preventing any relative movement.

17 Claims, 8 Drawing Sheets

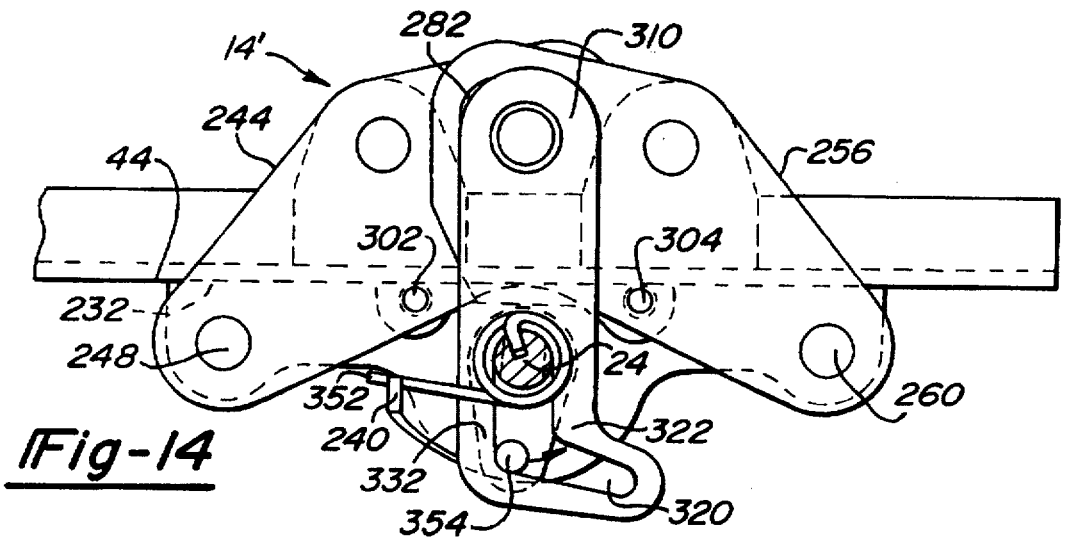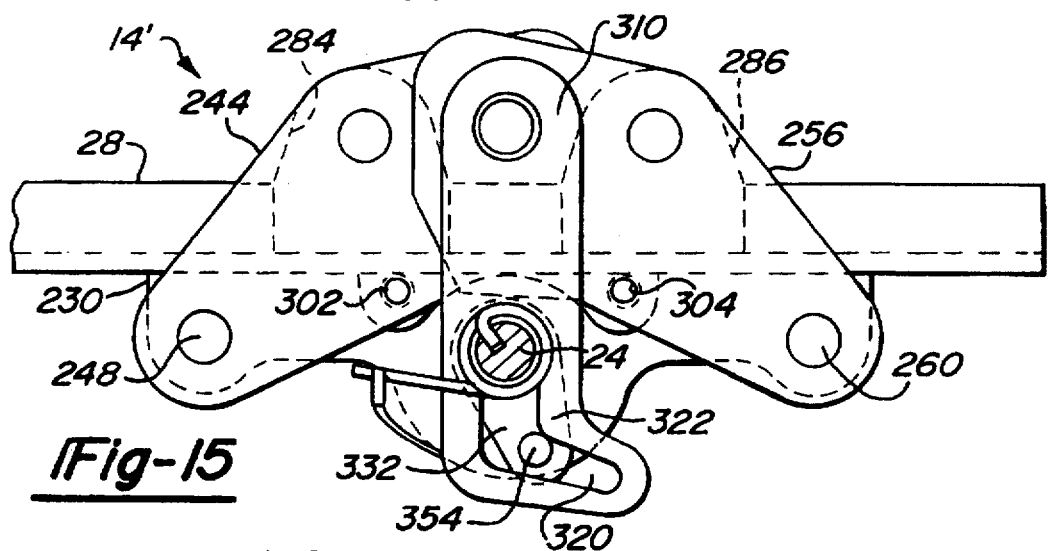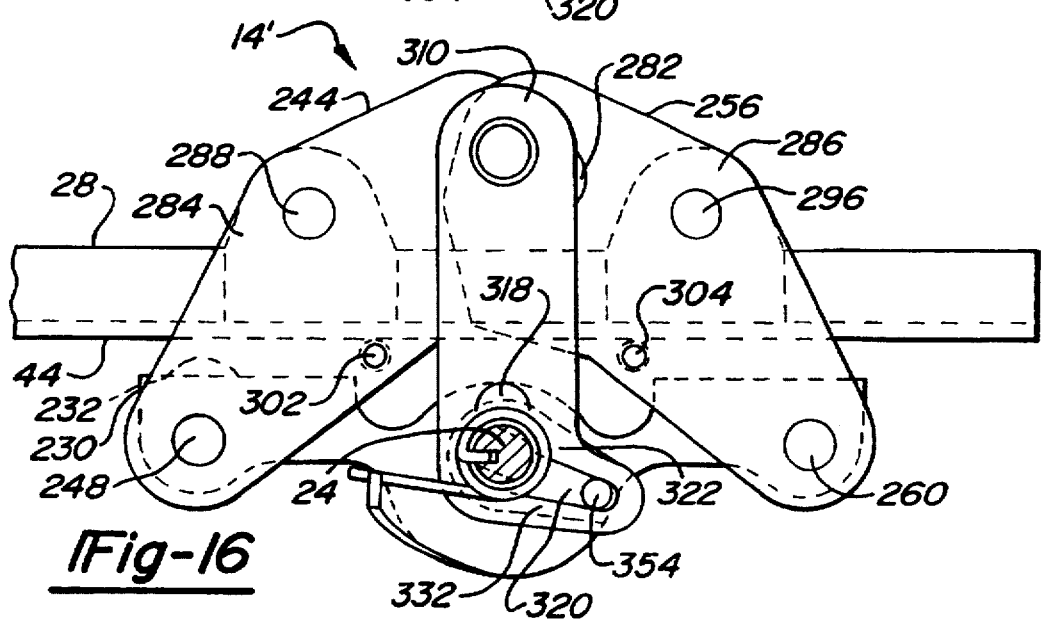

LINEAR ACTUATOR

CROSS REFERENCE TO RELATED APPLICATIONS

This application is a Continuation-in-Part of U.S. application Ser. No. 08/609,342, filed Mar. 1, 1996, now U.S. Pat. No. 5,618,083, for a Linear Seat Back Recliner Mechanism.

BACKGROUND OF THE INVENTION

I. Field of the Invention

This invention relates to a linear actuator, and, more particularly, this invention relates to a linear actuator particularly adapted for use to provide an infinitely adjustable seat back recliner mechanism.

II. State of the Art

As mentioned in our parent application, Ser. No. 08/609, 342, filed Mar. 1, 1996, automotive and aircraft seats are commonly provided with two or more adjustments for user comfort, most of them including an adjustment of the seat back relative to the seat cushion. There are numerous seat back recliner mechanisms available with the trend being toward the infinitely variable type. The industry presently defines an infinitely variable seat back recliner to be one capable of adjustments in increments as fine as one degree or less.

There is a wide variety of infinitely variable seat back recliner devices available, usually involving complex mechanisms with numerous parts including types with helical camming surfaces, friction drums, wedging rollers, split nut and screw devices, coil spring-rod locks, ratchet and palls, and the like. While these various mechanisms work and meet with varying degrees of success, they have various problems of added weight, and expense and usually a problem of occupying too much space. While much attention has been given to the force generated by the device to keep the mechanism in its adjusted position, there is notable silence on what happens when the device is subjected to a sudden or catastrophic force such as that occurring in a sudden braking or vehicle collision.

SUMMARY OF THE INVENTION

The present invention addresses the difficulties prevalent in the state of the art and pioneers in the area of handling unexpected forces. The result is a lightweight, compact linear actuator which will provide a very competitively priced seat back recliner mechanism.

The linear actuator of this invention includes a longitudinally extending actuator rod having an upper planar surface and a lower planar surface connected with opposed sides. An elongate lower clamp member has an upper planar friction surface for locking engagement with the lower planar friction surface of the actuator rod. The lower clamp member also has a central aperture for receiving a lock release shaft. A pair of generally triangular shaped lock plates, parallel and adjacent one of the actuator rod sides, pivotally connects to the lower clamp member at opposed ends of the member, and extends upwardly above and inwardly to overlap each other at a midpoint of the lower clamp member. A mounting fastener is received in an upper aperture of each of the overlapping lock plates for mounting the actuator to the stationary member. A pair of upper clamp members, each pivotally connected to one of the lock plates presents a planar surface in contact with the upper planar surface of the actuator rod.

According to a preferred embodiment, a spring is connected with each lock plate to bias the upper clamp member in contact with the upper planar surface of the actuator rod creating a locking engagement between the lower planar friction surface of the rod and the upper planar friction surface of the lower clamp member. A lock release shaft extends through the central aperture of the lower clamp member, and a cam contacts a lower edge of the lock plates as the lock release shaft is rotated for moving the lock plates upward to release the actuating rod for movement relative to the clamp members permitting position adjustment of the movable element.

When a load is applied to the actuator rod in its locked position, the load will be delivered to the stationary member through the mounting fastener by the lock plate on a side of the mounting fastener in the direction of the load, causing this load delivering lock plate to pivot downwardly to supply a greater force through the associated upper clamp member to maintain the actuating rod locked to the lower clamp member.

In the first preferred embodiment of the invention, the linear actuator cam for contacting a lower edge of the lock plates is on the upper surface of a lift plate keyed to the lock release shaft. Preferably this lift plate has a guide pin projecting through a guide slot in one of the front and rear retention plates. Also in the first preferred form of the invention, the linear actuator mounting fastener and lock release shaft pass through the front and rear retention plates to axially retain the mounting fastener and lock release shaft. The actuator further has two pairs of opposed generally triangularly shaped lock plates, a front pair and a rear pair, each having a left plate and a right plate, and each pair is pivotally connected to the lower clamp member at the opposed ends of the member, and the opposed plates of each pair are on opposite sides of the actuating rod. A left lift pin extends between the front left lift plate and the rear left lift plate, and a right lift pin extends between the front right lift plate and the rear right lift plate, which permit the lift pins to act against a bottom surface of the actuator rod as the lock release shaft is rotated and the cam contacts the lower edge of the lock placed to further positively guarantee lift of said actuator rod free from said lower clamp member to permit position adjustment of the movable element.

According to a further preferred embodiment, front and rear vertically actuable lift members are pivotally secured to the lift plates and provide the upwardly actuating motion of the lift pins. The lift members are each slotted with an upper vertical portion and a lower angled portion which includes an engaging shoulder. The lift members are each pivotally attached to a rotating cam member by an associated pin and, upon rotation of the lock release handle and lock release shaft which extends through the lift members and cam members, causes the rotating pins to engage the shoulder of each slot to actuate upwardly the lift members. The lift members in turn cause the lift plates to rotate in an upwardly and outwardly manner to cause the lift pins to upwardly engage and unseat the lower edge of the actuator rod from its opposing and upwardly facing surface of the lower clamp member.

In a further preferred embodiment of this continuation-in-part application, the upper planar friction surface of the lower clamp member is interrupted in a central portion of the friction surface, and an inertial locking element is freely suspended from the lock release shaft to extend upwardly between opposed sides of the lower clamp in the centrally interrupted portion so that when a sudden inertial force is applied to the actuator, the inertial locking element will be rotated to lock against the lower planar friction surface of the actuator rod to positively prevent any relative movement between the actuator rod and a body portion of the actuator. In a further preferred embodiment, the upper planar surface of the lower clamp member and the lower planar friction surface of the actuator rod have inter-locking serrations.

It will be readily seen that the inertial locking element of the present invention can be applied to virtually any type of linear actuators to ensure positive clamping when a sudden initial force is applied to the actuator thereby preventing any relevant movement between the actuator rod and the clamping member.

BRIEF DESCRIPTION OF THE DRAWING

The advantages of the present invention will be more apparent from the following detailed description when considered in connection with the accompanying drawing wherein:

FIG. 14 is a front side elevational view of the linear actuator according to the second preferred embodiment in a locked position;

FIG. 15 is a view of the linear actuator similar to that shown in FIG. 14 and further illustrating the lift members and cams in a partially unseated position;

FIG. 16 is a view similar to that shown in FIGS. 14 and 15 and further illustrates the lift members and overlapping and pivotally movable plate members of the linear actuator upwardly and outwardly rotated so as to cause the pin members to fully unseat the actuator rod from the lower clamp member.

DETAILED DESCRIPTION OF THE PREFERRED EMBODIMENT

Figure 1:
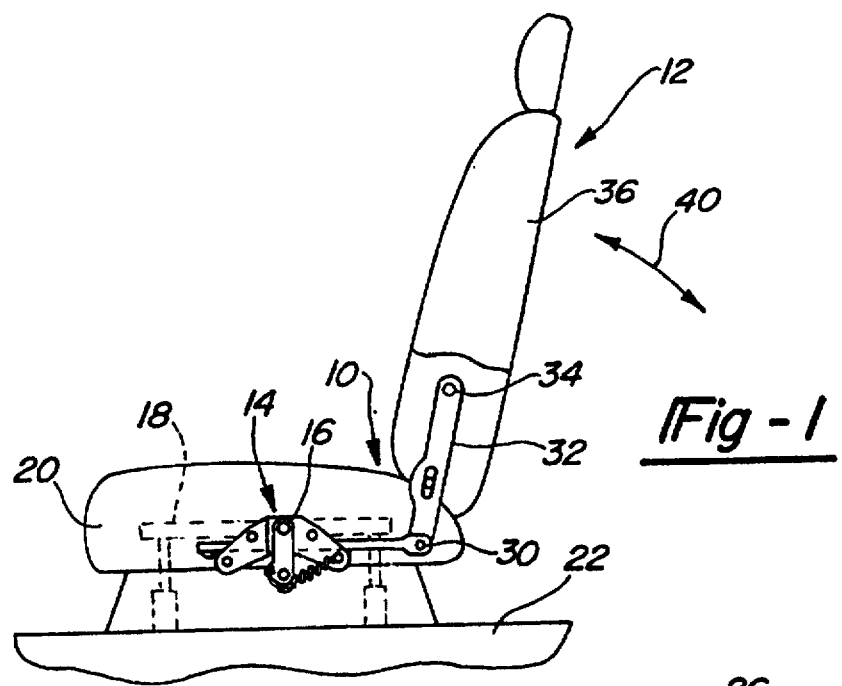
FIG. 1 is a side elevational view of a recliner seat with the linear actuator according to a first preferred embodiment of the present invention installed as part of a seat back recliner mechanism.
Figure 2:
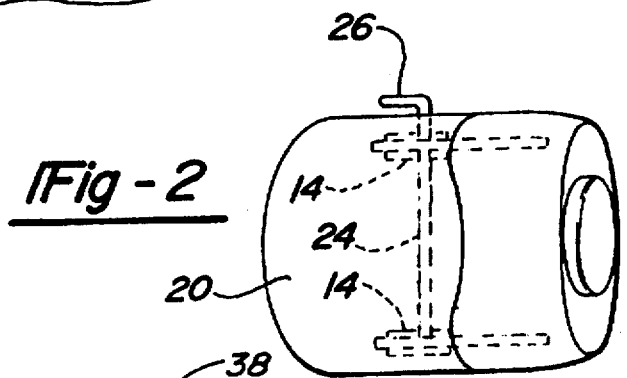
FIG. 2 is a plan view of a seat showing a typical location of a pair of linear actuators along with lock release linkage.
Figure 3:
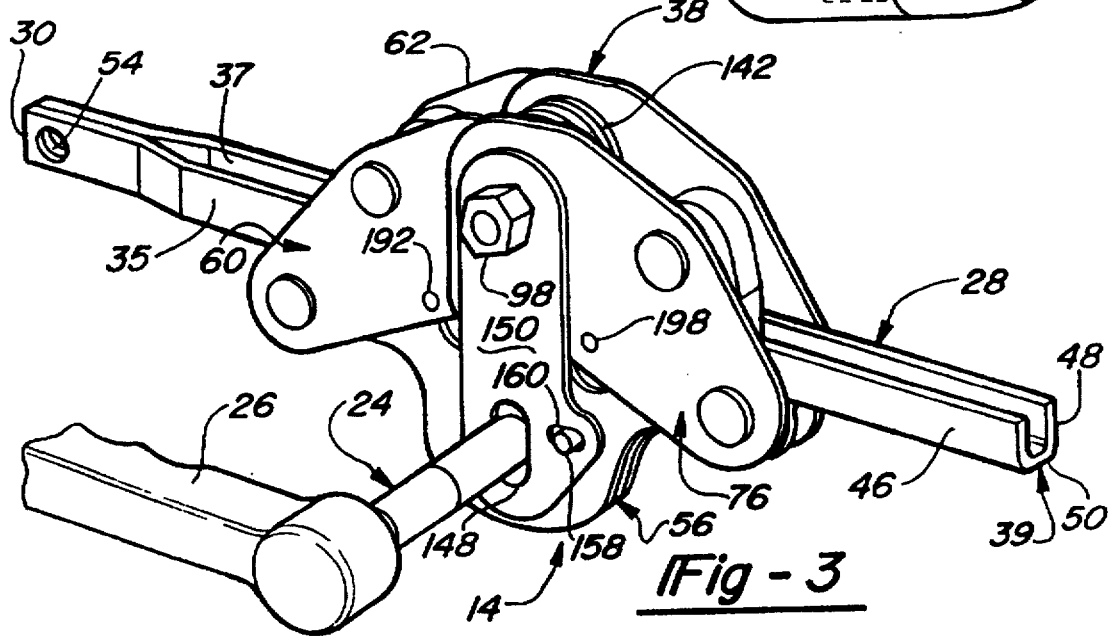
FIG. 3 is a perspective view of the linear actuator of the seat back recliner mechanism of the invention.

Referring to FIG. 1, the seat back recliner mechanism 10 of this invention is shown installed on a reclining seat 12 with the linear actuator 14 of the invention mounted on a control chassis mounting screw 16 affixed to a seat frame 18 of seat bottom 20; the seat frame in turn is attached to the vehicle floor 22. As seen in FIG. 2, two linear actuators 14 can be used adjacent the lateral sides of seat bottom 20 with a lock release shaft 24 inter-connecting the two actuators 14 with a lock release handle 26 on one side of the seat. Referring to FIGS. 1 and 3, an actuator rod 28 of the linear actuator 14 is pivotally connected at one end 30 of the rod to a recliner link 32 attached at 34 to a reclining seat back 36. Rotation of the lock release handle 26 releases the actuator rod 28 from a body 38 of the actuator 14, allowing the seat occupant to change the inclination of the seat back 36 as indicated by the arrow 40. Return of the handle 26 to its original position will relock the actuator with the seatback in its new position. It will be appreciated that the seat bottom 20 can be reciprocally movable on the frame 18 by another mechanism, not shown, such being another linear actuator 14. Specifically, it is envisioned that one or more linear actuators may also be employed to effectuate both up and down and forward and rearward motion of the seat bottom 20 relative to a frame incorporated into the vehicle floor 22 and such a modification would be within the ability of one skilled in the art based upon the following description of the linear actuator according to the present invention.

Figure 4:
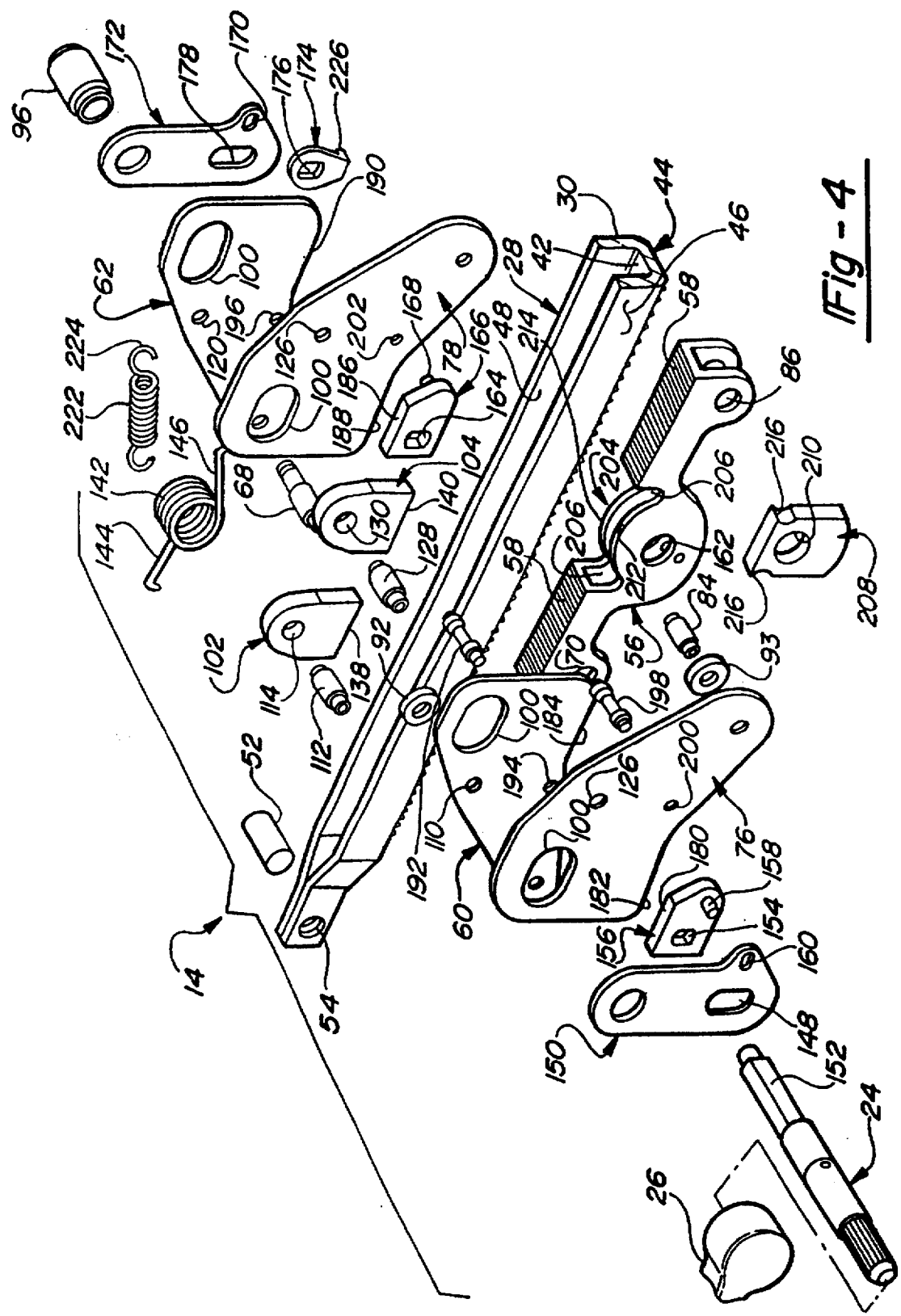
FIG. 4 is an exploded perspective view of the inear actuator of FIG. 3.
Figure 5:
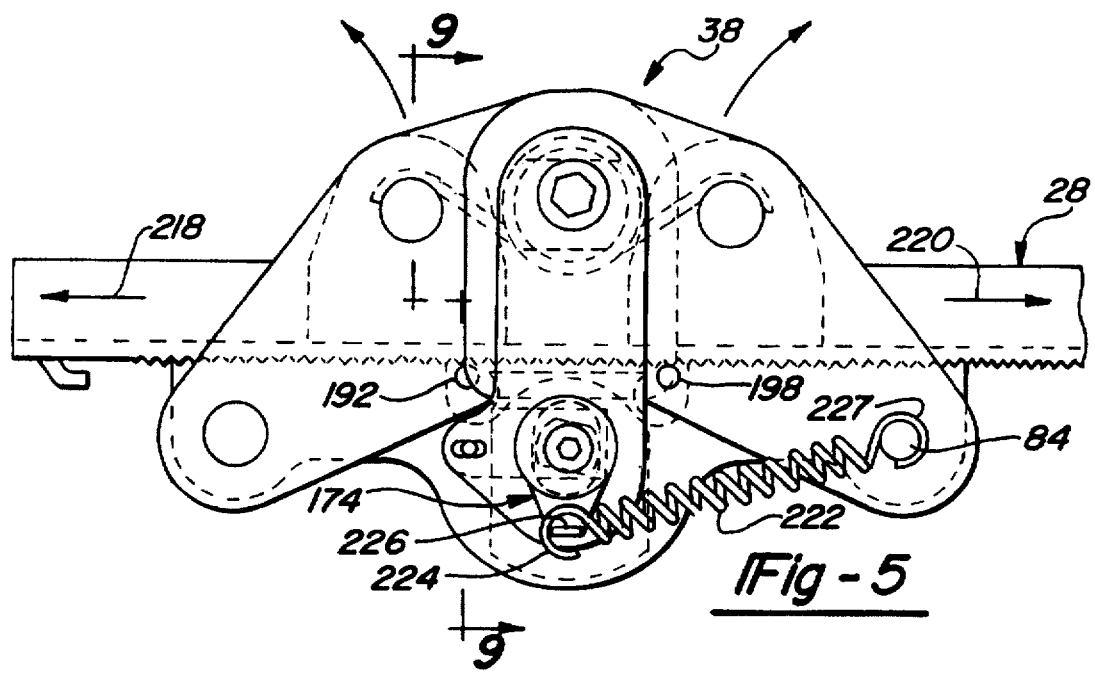
FIG. 5 is a side elevational view of the linear actuator of FIG. 3 with the lower clamp locked to the actuator rod.

Referring primarily to FIGS. 3–5, the linear actuator 14 has a longitudinally extending actuator rod 28 and an actuator body 38. The actuator rod 28 is a generally upright channel or U-shaped member having a front vertical leg or side 46 and a rear vertical leg or side 48 with a horizontal joining bight portion 50. The bight portion 50 has an upper planar surface 42 and a lower planar surface 44 that serves as friction surfaces. A pin 52 is inserted through a hole 54 of the rod 28 at one end 30 of the rod and supplies a pivotal connection to the link 32 of the recliner mechanism 10.

Figure 6:
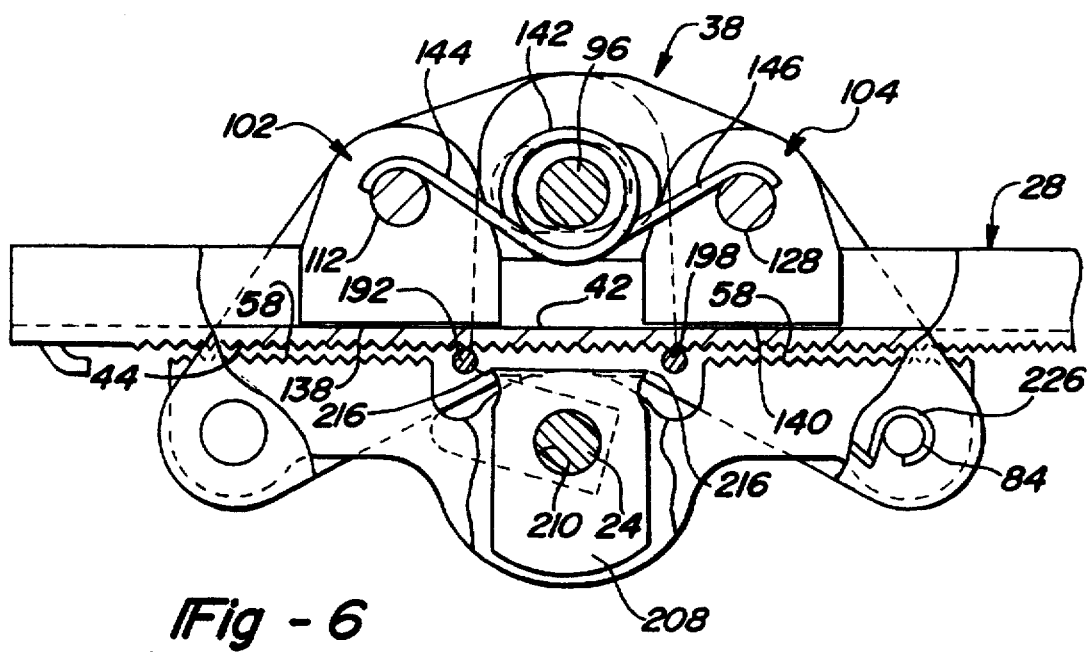
FIG. 6 is a side elevational view similar to FIG. 5 with portions of the lock plates on one side of the actuator rod broken away for clarity to show the actuator rod unlocked and raised from the lower clamp and showing the inactive or unlocked position of the inertial locking element.

The actuator body 38 has a number of assembled parts including a lower clamp 56 which has an upper planar friction surface 58 that coacts with the lower planar friction surface 44 of actuator rod 28. As best seen in FIGS. 4 and 6, friction surfaces 44 and 58 in their preferred form have inter-locking serrations to enhance their gripping power. These serrations can have a 0.5 mm pitch which will provide ½° adjustments of the seat back, well within the definition of an infinite adjustment.

Generally triangular shaped lock plates are pivotally connected at opposed ends of the lower clamp by fasteners. As best viewed in FIG. 4, front left lock plate 60 and rear left lock plate 62 are pivotally attached to opposite ends of a left threaded bushing 68 located in a hole 70 in the left side of lower clamp 56. Similarly a front right lock plate 76 and an opposed rear right lock plate 78 are pivotally attached to opposite ends of a right threaded bushing 84 located in a hole 86 in the right side of the lower clamp 56. The lock plates extend upwardly, straddling the actuator rod 28, and inwardly so that the lock plates 60 and 76 overlap each other, and plates 62 and 78 overlap each other. Also a left spacer 92 is located on the left threaded bushing 68 between the rear side 48 of the actuator rod 28 and the rear left lock plate 62, and a right spacer 93 is located on the right threaded bushing 84 between the front side 46 of the actuator rod 28 and the front right lock plate 76.

A frame mounting rivet 96 passes through apertures or windows 100 in the overlapping portions of each of the plates. The apertures or windows 100 can be generally square or rectangular allowing clearance for movement of the lock plates when a force is applied to the actuator rod 28. As explained in detail in our parent application, Ser. No. 08/609,342, filed Mar. 1, 1996, when a load is applied to rod 28 to the right, the load will be transferred by the lock plates 76 and 78 to the mounting rivet 96 by contact of the left side of windows 100 with the mounting rivet 96. When a load is applied to the rod 28 to the left, the load will be transferred by the lock plates 60 and 62 to the mounting rivet 96 by contact with the right sides of windows 100.

A pair of left and right upper clamps 102 and 104 are mounted to the lock plates. The left upper clamp 102 is mounted through a hole 110 in the left front lock plate 60 by a left threaded bushing 112 located in a hole 114 in the left upper clamp 102, and the left rear lock plate 62 is mounted to the bushing 112 through a hole 120 in the lock plate 62 by the bushing 112. In a similar manner the right upper clamp 104 is mounted through a hole 126 in the right front lock plate 76 by a right threaded bushing 128 located in a hole 130 in the right upper clamp 104, and an end of the bushing 128 secures the right rear lock plate 78 passing through a hole 126 in the lock plate 78. Upper left clamp 102 and upper right clamp 104 have lower planar surfaces 138 and 140 respectively which contact the upper planar surface 42 of the actuator rod 28.

A coil spring 142 is secured around the frame mounting rivet 96 and includes a left arm 144 with a hook which engages the left threaded bushing 112 and a right arm 146 and hook which engages the right threaded bushing 128 to exert a continuous downward bias force on the bushings and the left and right upper clamps 102 and 104 to force the lower planar surfaces 138 and 140 of the clamps against the upper planar surface 42 of the actuator rod to keep the lower planar friction surface 44 of the actuator rod 28 in contact with the friction surface 58 of the lower clamp 56, locking the actuator rod in place. The spring 142 thus also biases the lock plates 60, 62, 76 and 78 to pivot downwardly about the axes of the left and right threaded bushings 68 and 84 pivotally connecting the lock plates to the lower clamp.

The lock release shaft 24 passes through a vertical slot 148 in a front retention plate 150 with a keyed or square portion 152 of the shaft engaging a keyed or square aperture 154 in a front lift plate 156 located rearwardly of the front retention plate 150. The lift plate 156 has a forwardly extending guide pin 158 which slides and is guided in slot 160 of the front retention plate 150. The lock release shaft 24 continues through the central hole 162 in the lower clamp 56 with clearance and engages a keyed or square aperture 164 in the rear left plate 166. The rear lift plate 166 has a rearwardly extending guide pin 168 which slides and is guided in slot 170 of a rear retention plate 172. The lock release shaft 24 continues through the return element 174 with the keyed or square portion 152 of the release shaft 24 engaging the keyed or square apertures 176 in the return element, and the shaft exits through a vertical slot 178 in the rear retention plate 172 with clearance.

When the lock release handle 26 is rotated counterclockwise, an upper cam surface 180 of the front left plate 156 engages a lower edge or surface 182 of the front right lock plate 76 and a lower edge 184 of the front left lock plate 60, and an upper cam 186 of the rear left plate 166 engages a lower edge 188 of the rear right left plate 78 and a lower edge 190 of the rear left lock plate 62, lifting all four lock plates 60, 62, 76 and 78. The lift plates 60, 62, 76 and 78 are upwardly and outwardly rotated and in turn lift the left and right upper clamps 102 and 104 and their lower planar surfaces 138 and 140 of the upper clamps respectively from the upper planar surface 42 of the actuator rod to permit upward movement of lower planar surface 44 of the actuator rod 28 from the upper planar surface 58 of the lower clamp 56.

As is also seen upon reference to FIGS. 7–10, a left lift pin 192 extends through a lower aperture 194 and is attached to the left front lock plate 60. The left lift pin extends rearwardly underneath the lower planar surface 44 of the actuator rod 28 and passes through a lower aperture 196 and is attached to the left rear lock plate 62. Similarly a right lift pin 198 extends through a lower aperture 200 and is attached to the right front lock plate 76. The right lift pin extends rearwardly underneath the lower planar surface 44 of the actuator rod 28 and passes through a lower aperture 202 and is attached to the right rear lock plate 78. When the crank arm 26 and the lock release shaft 24 is rotated counterclockwise lifting all the lock plates 60, 62, 76 and 78, the left and right lift pins 192 and 198, acting against the lower planar surface 44 of the actuator rod, will lift the lower planar surface 44 and the actuator rod 28 vertically free from the upper planar surface 58 of the lower clamp permitting adjustment of the actuator rod 28 in either direction to rotate the seat back in either direction as shown by the arrow 40 in FIG. 1.

When the adjustment of the seat back position has been completed with the actuator rod in its raised position, release of the lock release handle 26 will automatically assure return of the lock release shaft 24 to its locked position by virtue of the return element 174 which is keyed by its square aperture 176 to the keyed portion 152 of the release shaft 24. As best seen in FIG. 5, a return spring 222 with a hook 224 at one end engages a projection 226 on the return element 174, and a hook 227 at the other end of the spring 222 engages an extension of the right threaded bushing 84 to exert the lock release shaft 24 return force.

Figure 7:
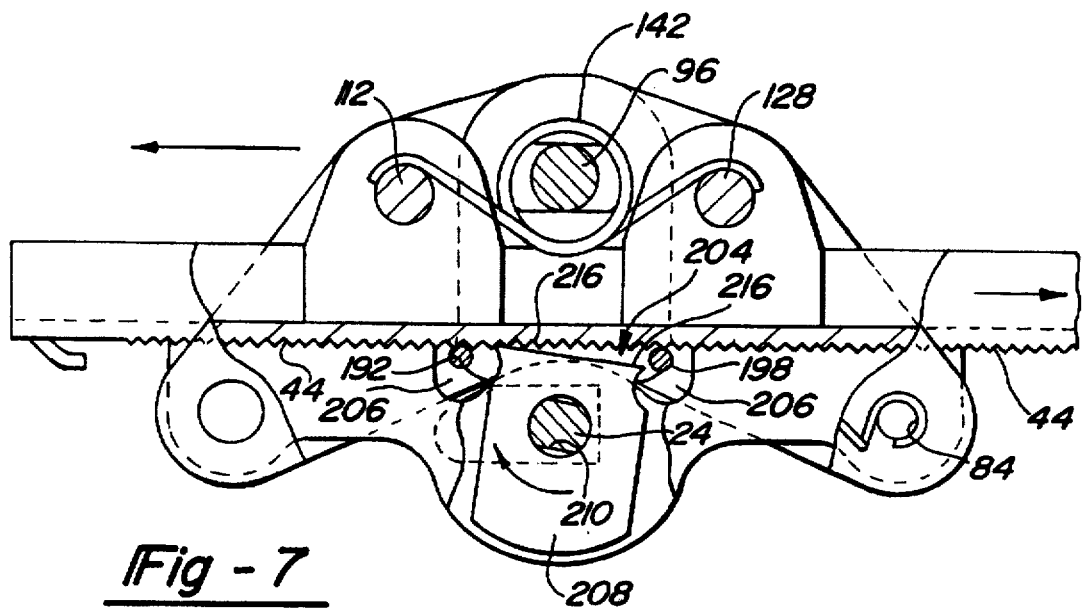
FIG. 7 is a side cross-sectional view of the linear actuator of FIG. 3 taken along line 7—7 of FIG. 8 and showing a locked position of the inertial locking element when a sudden force has been applied to the mechanism.
Figure 8:
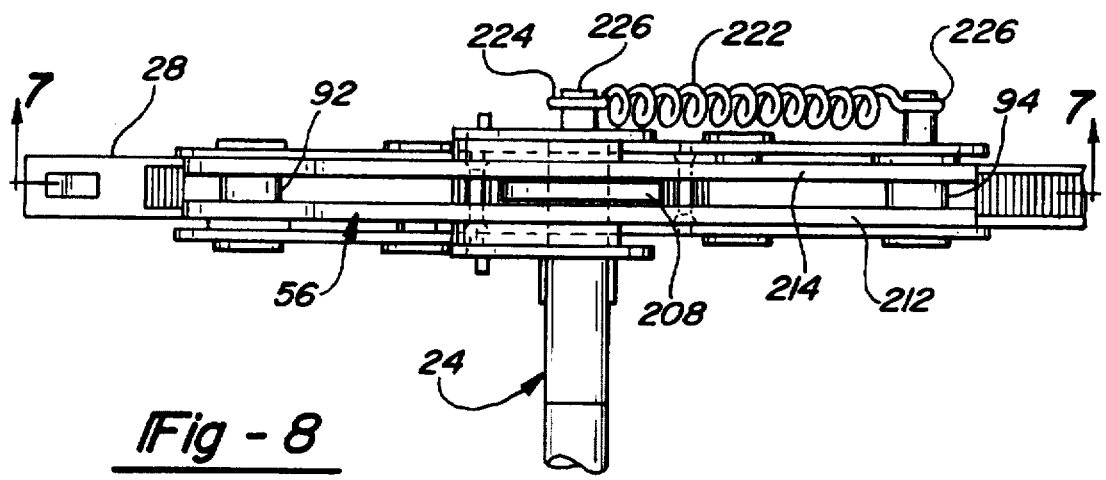
FIG. 8 is a top cross-sectional view of the actuator of FIG. 3.
Figure 9:
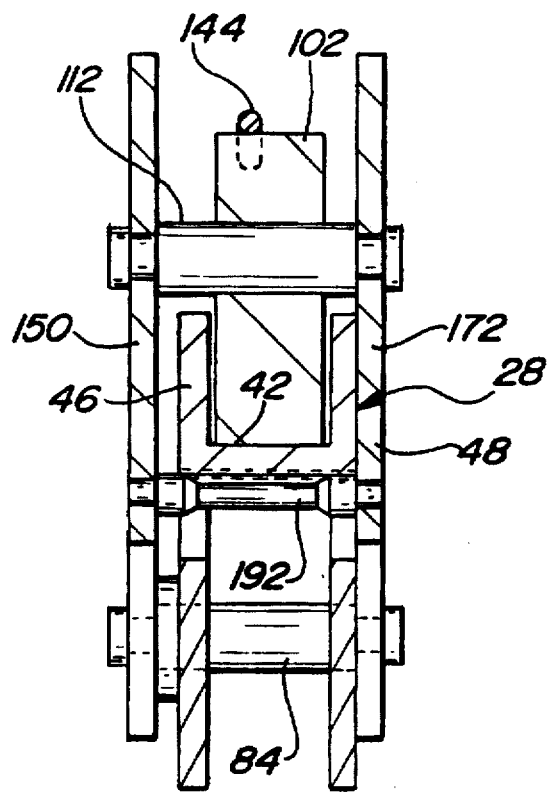
FIG. 9 is an end elevational cross-sectional view taken along line 9—9 of FIG. 5 with the actuator in its normally locked position.
Figure 10:
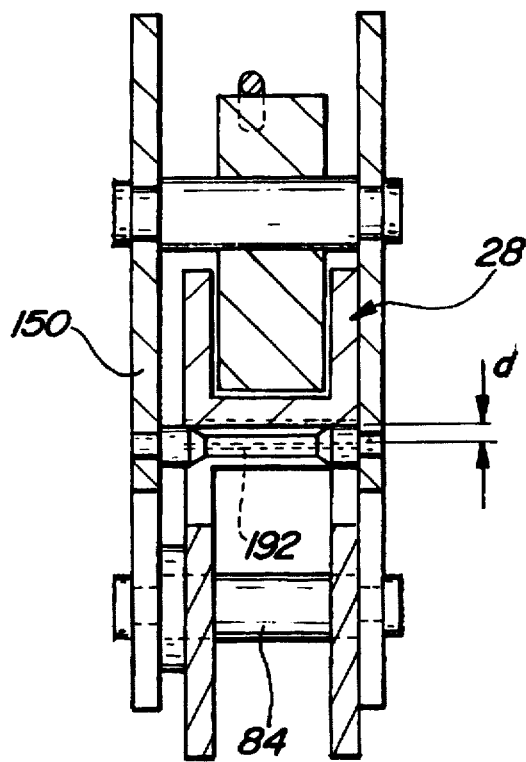
FIG. 10 is a view similar to FIG. 9 with the actuator in its unlocked or opened adjustable position.

A special provision of the present invention is an inertial locking feature which positively locks the actuator rod 28 to the lower clamp 56 upon the sudden application of a force such as in a vehicle collision or sudden braking. The lower clamp 56 is provided with an arcuate relief channel 204 centrally in its upper planar surface 58 with an arcuate bottom vertical passage 206 at each end to accommodate the left and right left pins 192 and 198. A generally rectangular shaped inertial locking element 208 has a circular aperture 210 through which the lock release shaft 24 passes to freely suspend the inertial locking element on the shaft 24. The inertial locking extends upwardly between opposed sides 212 and 214 of the generally hollow lower clamp 56 in the arcuate relief channel so that when a sudden inertial force is applied to the vehicle and actuator, the inertial locking element will be flung upwardly to lock one of its upper corners 216 against the lower planar friction surface 44 of the actuator rod 28 as shown in FIG. 7 to positively lock the actuator rod to the lower clamp 56 of the actuator body 38, preventing any relative movement between the actuator rod 28 and the actuator body 38. In a preferred form of the invention, the lower planar friction surface 44 of the actuator rod 28 and the upper planar friction surface 58 of the lower clamp contain interlocking serrations which aid in the normal locking and inertial locking of the elements together. These serrations typically have a 0.5 mm pitch which will provide ½° adjustments of the seat back, well within the definition of an infinite adjustment.

In summary, when a load is applied to the actuator rod 28 in either direction as indicated by the arrows 218 and 220 in FIG. 5, the load transmitted to the frame mounting bolt 96, and thus to the vehicle frame, will create a downward force couple on the lock plates which are located between the mounting bolt and the force direction side which will further lock the friction surfaces or serrations of the actuator rod and the lower clamp member. Thus when the force is to the left as indicated by 218 in FIG. 5, the right threaded bushing 84 to transmit a downward force on the right upper clamp 104, and when the force is to the right as indicated by the arrow 220 in FIG. 5, the left plates 60 and 62 will pivot downwardly about the left threaded bushing 68 to transmit a downward force on the left upper clamp 102. When such a force is suddenly applied, as in a vehicle collision, the inertial locking element 208 will swing upwardly to positively lock the actuator body 38 to the actuator rod 28 to prevent any movement.

Figure 11:
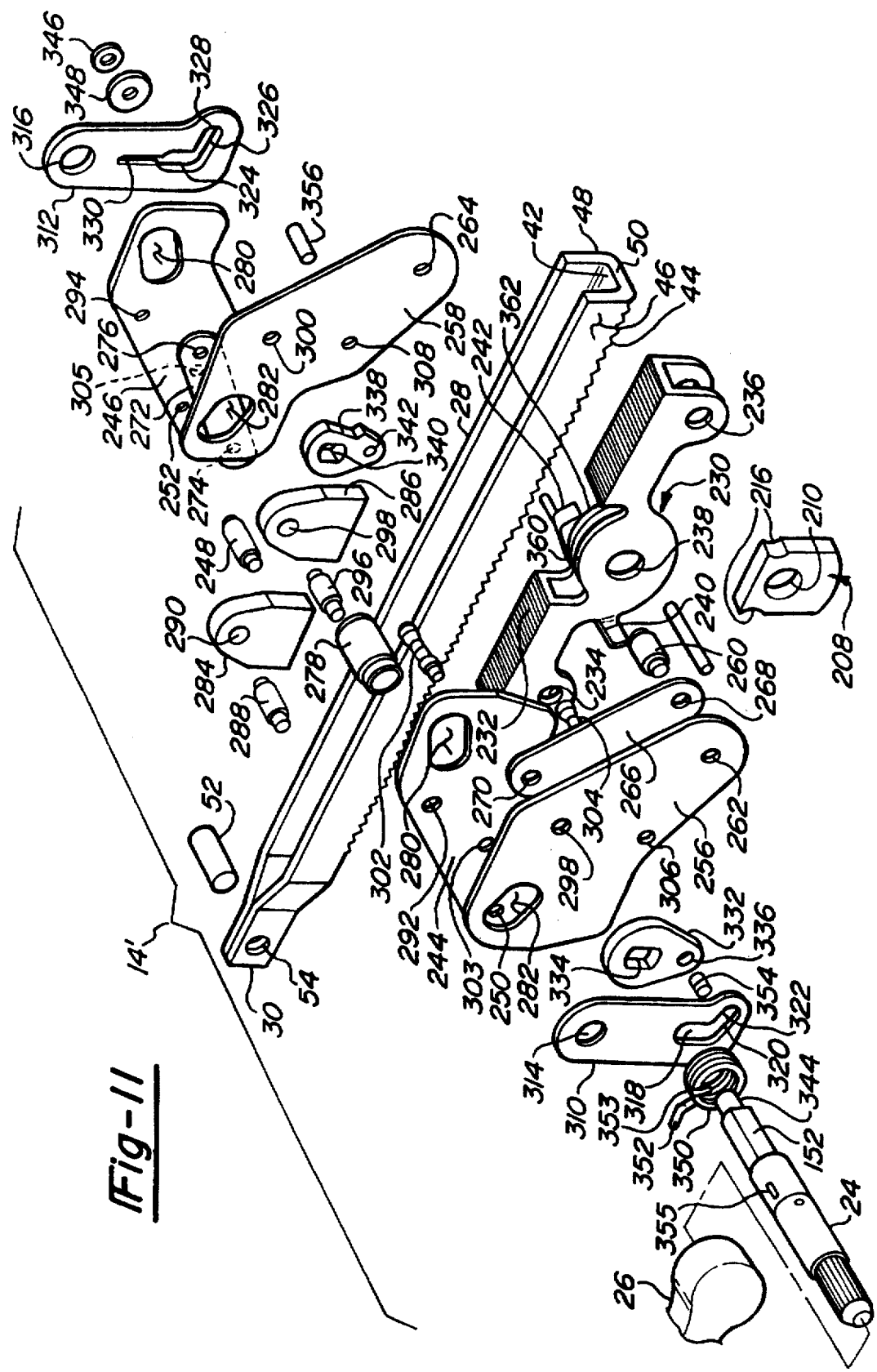
FIG. 11 is an exploded perspective view of the linear actuator according to a second preferred embodiment of the invention.

Referring now to FIG. 11, a further preferred embodiment 14' is shown of a linear actuator according to the present invention. The actuator rod 28 remains unchanged in the second preferred embodiment and includes a U-shaped cross section having the front vertical side 46, rear vertical side 48 and horizontal joining bight portion 50 which exhibits a lower planar serrated or frictional surface 44. A lower clamp 230 is provided and includes an upper planar friction surface 232 that coacts with the lower planar friction surface 44 of the actuator rod 28. The lower clamp 230 further includes a left side hole 234 and a right side hole 236 in addition to a central hole 238. The clamp 230 also further includes a forwardly extending and spring-engaging tab portion 240 and a rearwardly extending lift member guide portion 242, the purpose for which will be subsequently described.

A front left lock plate 244 and rear left lock plate 246 are pivotally attached by a rivet or bushing 248 which pivotally secures at a first end through a hole 250 in the front left lock plate 244 and at a second end through a hole 252 in the rear left lock plate 246. Similarly, a front right lock plate 256 and a rear right lock plate 258 are pivotally attached by a bushing 260 which pivotally secures at a first end through a hole 262 in the front right lock plate 256 and at a second end through a hole 264 in the rear right lock plate 258. A front intermediate mounting portion 266 is provided and is sandwiched between the front right lock plate 256 and vertical side 46 of actuator rod 28. The front intermediate mounting portion 266 includes a hole 268 through which is engaged the bushing 260 and a hole 270. A rear intermediate mounting portion 272 is likewise provided and is sandwiched between the rear vertical side 48 of actuator rod 28 and the rear left lock plate 246 The rear intermediate portion 272 includes a hole 274 through which is engaged the bushing 248 and a hole 276. The purpose of the front and rear intermediate mounting portions 266 and 272 is to provide stability to the front-most right front lock plate 256 and rear-most left rear lock plate 246 and to maintain their spaced apart relationship relative to the from side 46 and rear side 48 of the actuator rod 28.

A main mounting rivet 278 is provided and extends through and pivotally secures together the triangular shaped lock plates. Specifically, the lock plates each include an apertured or window portion through which is engaged the main mounting rivet 278, the front left lock plate 244 and rear left lock plate 246 having a first diagonally extending apertured portion 280 and the front right lock plate 256 and rear right lock plate 258 having a second diagonally extending apertured portion 282. As will be subsequently described, the shaping of the apertured portions 280 and 282 facilitate the upwardly and outwardly actuating motion of the lock plates 244, 246, 256 and 258. Although not clearly evident from the illustrations provided, each of the rivets or bushings provide outwardly annularly extending lips at their opposing ends for engaging the lock plates together and dispense with the need for additional threaded bolts and nuts or other like fastener.

A left upper clamp 284 and a right upper clamp 286 are mounted to the lock plates. A rivet 288 extends through a hole 290 in the left upper clamp 284 and pivotally secures at a forward end to an aperture 292 in the front left lock plate 244 and at a rearward end to an aperture 294 in the rear left lock plate 246. A rivet 296 extends through a hole 298 in the right upper clamp 286 and pivotally secures at a forward end to an aperture 298 in the front right lock plate 256 and at a rearward end to an aperture 300 in the rear right lock plate 258. The rivet 288 likewise extends through the aperture 274 in the rear intermediate mounting portion 272 and the rivet 296 likewise extends through the aperture 270 in the front intermediate mounting portion 266.

A left lift pin 302 extends through aperture 303 of the front left lock plate 244 at a forward end and through aperture 305 (illustrated in phantom in FIG. 11) of the rear left lock plate 246 at a rearward end. A right lift pin 304 extends through an aperture 306 of the right front lock plate 256 at a forward end and through an aperture 308 of the right rear lock plate 258 at a rearward end. Both the left lift pin 302 and right lift pin 304 extend across the underside of the actuator arm 28 in proximity to the lower serrated face 44 similarly to the lift pins 192 and 198 described in the first preferred embodiment and operate in likewise fashion as will be subsequently described.

A first vertically actuable lift member 310 is located at a forward location of the linear actuator and a second vertically actuable lift member 312 is located at a rearward location. An aperture 314 is located at an upper end of the forward lift member 310 and an aperture 316 is located at an upper end of the rearward lift member 312, the forward and rearward ends of the main rivet 278 pivotally securing within the apertures 314 and 316. A slotted portion 318 is formed at a lower end of the forward lift member 310 and includes an upper vertical portion and a lower angled portion 320 which is bounded in part by a downwardly angled engaging shoulder 322. A slotted portion 324 is formed at a lower end of the rearward lift member 312 and includes an upper vertical portion and a lower angled portion 326 which is bounded in part by a downwardly angled engaging shoulder 328. The slotted portion 324 of the rearward lift member 312 further includes an upwardly narrowed and vertically extending channel 330 through which is received the rearwardly extending lift member guide portion 242 of the lower clamp 230. A forward rotating cam member 332 is positioned rearwardly of the forward lift member 310 and includes an upper keyed aperture 334 and a lower receiving aperture 336. A rearward rotating cam member 338 is positioned forwardly of the rearward lift member 312 and includes an upper keyed aperture 340 and a lower receiving aperture 342.

The keyed or square elongated and extending portion 152 of the lock release shaft 24 extends successively through the slotted portion 318 of the forward lift member 310, the keyed aperture 334 of the forward cam member 332, the center hole 238 of the lower clamp 230, the keyed aperture 340 of the rearward cam member 338 and the slotted portion 324 of the rearward lift member 312. A cylindrical forward tip 344 of the extending portion 152 is dimensioned in reduce diameter and projects beyond the slotted portion 324 where a disk member 346 is fixedly secured and a washer 348 is intermediately sandwiched on a reverse face of the rearward lift member 312 in a freely rotatable manner.

A coil spring 350 is mounted to the lock release shaft 24 and includes an extending end 352 which abuts against the tab portion 240 of the lower clamp 230. An inwardly turned end 353 of the spring 350 is affixed to a slot 355 formed in the lock release shaft 24 to anchor the spring 350 to the shaft. A forward pin 354 is fixedly secured within the aperture 336 of the forward rotating cam member 332 and is received through the slotted portion 320 of the forward lift member. A rearward pin 356 is likewise fixedly secured within the aperture 342 of the rearward cam member 338 and is received through the slotted portion 326 of the rearward lift member 312.

In operation, rotation of the lock release shaft 24 and lock release handle 26 in a counter clockwise direction causes the forward rotating cam member 332 and rearward rotating cam member 338 to likewise rotate counter clockwise, causing the forward mounted pin 354 and rearward mounted pin 356 to rotate within their associated slotted portions 320 and 326 until the pins coact with the downwardly angled shoulders 322 and 328. At this point, continued rotation of the cam members 332 and 338 causes the pins 354 and 356 to continue to rotate in an upward circular path, causing in turn continued travel of the pins 354 and 356 along the paths of the lower angled portions 320 and 326 of the slotted portions and along the shoulders 322 and 328, causing the lift members 310 and 312 to unseat and to travel vertically upwardly. The forward and rearward triangular shaped lock plates 244, 246, 256 and 258 are in turn pivoted both upwardly and outwardly as a result of the pivotal connection with the forward and rearward lift members 310 and 312 through their apertures 314 and 316. The upward and outward pivoting motion of the lock plates in turn causes the linkage mounted lift pins 302 and 304 to actuate upwardly against the underside of the actuator rod 28 and to unseat the lower serrated face 44 of the actuator rod 28 from the upper serrated face 232 of the lower clamp 230. Concurrently, the left upper clamp 284 and right upper clamp 286 are upwardly unseated from the upper planar surface 42 within the U-shaped channel of the actuator rod 28 by the rivets 288 and 296 which are pivotally connected to the lock plates. The bias generated between the coil spring end 352 and the tab 240 of the lower clamp 230 responsive to the initial rotative motion of the release lock handle causes a return clockwise rotation of the lock release shaft 24 to reseat the lower serrated edge 44 of the actuator rod 28 with the upwardly serrated edge 232 of the lower clamp once the desired readjusted position is obtained.

As with the first preferred embodiment, the inertial locking element 208 is mounted within a central opening of the lower clamp 230 defined by opposed sides 360 and 362, with the lock release shaft 24 extending through the circular aperture 210 of the locking element 208. The locking element 208 operates in likewise fashion with one of its upper corners 216 engaging the lower serrated edge 44 of the actuator rod 28 upon the incidence of an immediate impact force to lend additional reinforcing support to the linear actuator.

Figure 12:
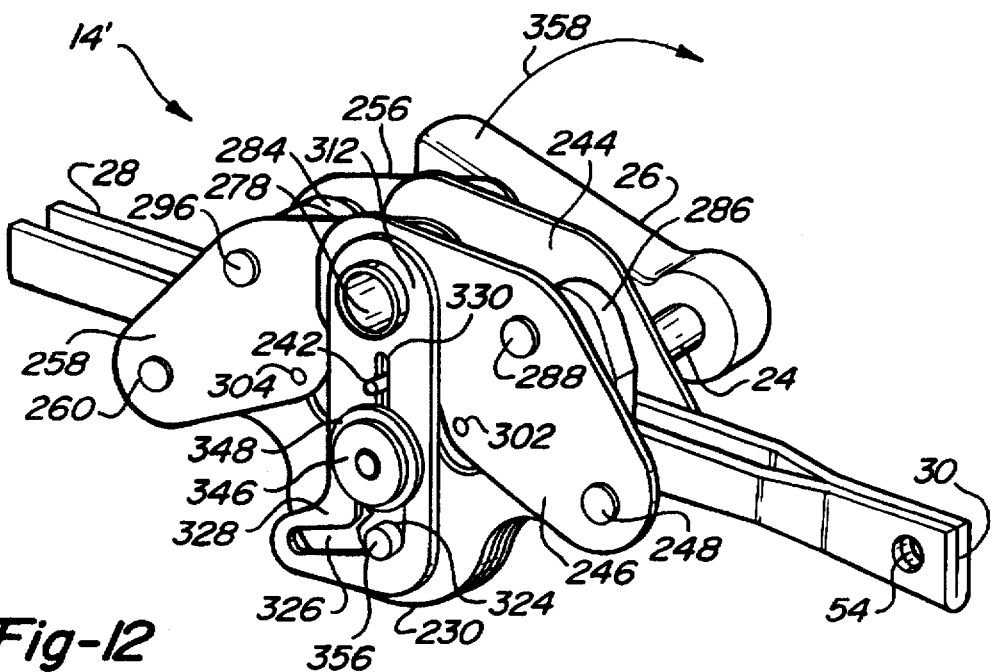
FIG. 12 is a perspective view of the linear actuator of the seat back recliner mechanism according to the second preferred embodiment and illustrating the rotational direction of the lock release handle.
Figure 13:
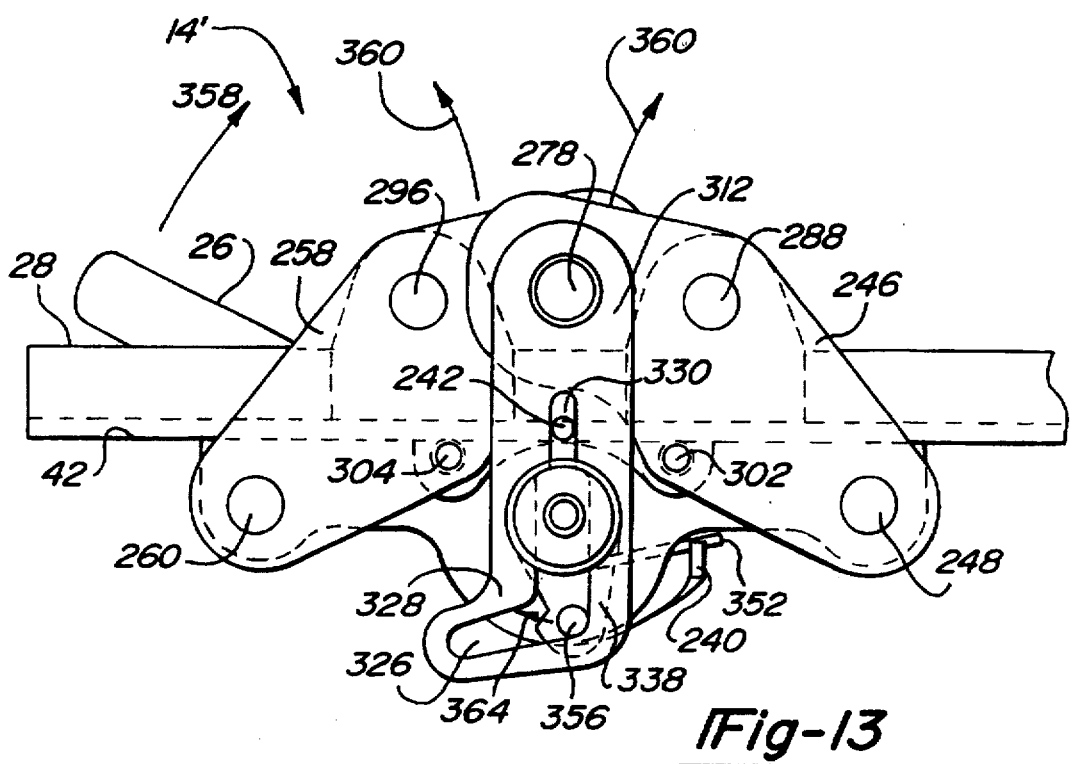
FIG. 13 is a rear side elevational view of the linear actuator according to FIG. 12 in a locked position.

Referring further to FIGS. 12 and 13, the range of motion of the linear actuator during the lock-release step is more clearly illustrated from the rear side thereof, with the lock release handle 26 being rotated in a directional path illustrated by arrow 358. As a result, the lift members (illustrated in these FIGS. 12 and 13 by rear lift member 312) through their pivotal linkage connection with the pairs of triangular shaped lock plates through the main rivet 278 cause the upwardly and outwardly pivotal motion of the lock plates in the direction illustrated by arrows 360 and 362. As is best illustrated in FIG. 13, the rearward cam member 338 is illustrated in rotating fashion by arrow 364 prior to the upward actuation of the lift members and the lift member guide portion 242 is illustrated within the upper narrowed vertical channel 330 in the rear slotted portion 324. The projecting guide portion 242 is optional in nature, however it assists in the further preferred embodiment in facilitating the exclusive vertical up and down motion of the lift member 312 in response to the rotation of the lock release handle 26.

Referring finally to FIGS. 14, 15 and 16, a frontal view of the linkage assembly of the linear actuator is presented in partial phantom and better illustrates the disengaging motion of the actuator rod 28 from the lower clamp 230 which permits the linear adjustment of the actuator rod 28 in one of either forward or rearward directions to in turn reposition the seat back in a desired angular orientation relative to the seat bottom. Referring to FIG. 14, the linear actuator 14' is shown in a first locked position with the lower serrated face or edge 44 of the actuator rod 28 firmly engaged with the upper like serrated face 232 of the lower clamp 230, the rotatable cam member 332 in a first substantially vertical position and the pin 354 located within a generally lower centralized position within the slotted portion 322 of the lift member 310.

Referring further to FIG. 15, the rotating cam 332 and pin 354 are illustrated in a second partially unlocking position in which the cam 332 is traveling in a counter clockwise direction and the pin 354 is beginning to enter the lower angled portion 320 of the slot and to coact against the downwardly angled shoulder 322. At this point, the lift members (shown again by lift member 310) begin to actuate vertically upwardly such that the lock plates initiate their upwardly and outwardly pivoting motion. The pivoting action of the lock plates is further illustrated by the apertured or window portion 282 partially shown in FIG. 14 in the locked position which, upon initial pivoting of the plates, disappears in the intermediate view of FIG. 15.

Referring finally to FIG. 16, the rotating cam 332 and pin 354 are illustrated in a fully counter clockwise direction in which the pin 354 has traveled substantially the distance of the angled portion 320 of the slot along the downwardly extending shoulder 322 and is located at a bottom-most position. At this point, the lift members (again illustrated by lift member 310) are actuated to their highest vertical position such that the lock release shaft 24 is arranged at a bottom position relative to the lift members and where an upper portion of the vertical channel 318 of the lift member 310 is evident from the illustration. Also shown in FIG. 16 is a corner of the apertured or window portion 282 of the right front lock late 256 which is indicative of it being in an upper and most outwardly pivoted position.

Once again, release of the lock release handle 26 will result in the coil spring 350 mounted about the shaft 24 to rotate the cam members 332 and 338 in a reverse direction by virtue of the spring leg 352 and tab 240 arrangement, thus reseating the pins 354 and 356 within their initial and centralized location of the vertical guide slots 318 and 324 of the lift members 310 and 312. Also, the inertial locking member 208, shown in FIG. 11, operates in identically the same fashion as explained in the first preferred embodiment.

Having described my invention, additional preferred embodiments will become apparent to those skilled in the art to which it pertains without deviating from the scope of the appended claims.

We claim:

1. A linear actuator for use in a position adjusting mechanism for adjusting the position of a movable element relative to a stationary member, comprising:

a longitudinally extending actuator rod having an upper planar surface and a lower planar friction surface connected with opposed sides;

an elongate lower clamp member having an upper planar friction surface for locking engagement with said lower planar friction surface of said actuator rod, and a central aperture for receiving a lock release shaft;

a first pair of generally triangular shaped and parallel spaced lock plates located adjacent to one side of said actuator rod and a second pair of generally triangular shaped and parallel spaced lock plates located adjacent the other side of said actuator rod, said pairs of lock plates being pivotally connected to said lower clamp member at opposed ends of said lower clamp member and extending upwardly and inwardly to overlap each other at a midpoint of said lower clamp member;

pivotal mounting means being received in an upper aperture of each of said lock plates for mounting said actuator rod to said stationary member;

a pair of upper clamp members, each pivotally connected to one of said lock plates and presenting a planar surface in contact with said upper surface of said actuator rod;

biasing means for biasing said upper clamp members in contact with said upper planar surface of said actuating rod, said biasing means creating a locking engagement between said lower planar friction surface of said rod and said upper planar friction surface of said lower clamp member;

said lock release shaft extending through said central aperture of said lower clamp member and at least one cam member being mounted to said lock release shaft, said at least one cam member upon rotation of said lock release shaft actuating said lock plates upwardly and outwardly to release said actuating rod for movement relative to said clamp members and permitting position adjustment of said movable element through said position adjusting mechanism; and an inertial locking element freely suspended from said lock release shaft and within an arcuate relief channel located centrally within said lower clamp, said inertial locking element including opposing upper corners and, upon the occurrence of a sudden impact force, said locking element rotating about said shaft such that a selected one of said upper corners engages said lower planar friction surface of said actuator rod to reinforce the engagement between said clamp member and said actuator rod and to prevent any relative movement therebetween.

2. The linear actuator according to claim 1, said at least one cam member further comprising a front lift plate and a rear lift plate arranged on opposite sides of said lower clamp member and keyed to said lock release shaft, each of said lift plates further including an upper cam surface which contacts a lower edge of said lock plates as said lock release shaft is rotated for moving said lock plates upward.

3. The linear actuator according to claim 2 wherein said lift plates each include a guide pin projecting through a guide slot in one of a front and rear retention plate.

4. The linear actuator according to claim 3 wherein said mounting fastener and said lock release shaft pass through said front and rear retention plates and said mounting fastener and lock release shaft are axially retained against said front and rear retention plates.

5. The linear actuator according to claim 4, said first pair of triangular shaped plates further comprising a front left lock plate and a front right lock plate and said second pair of triangular shaped plates including a rear left lock plate and a rear right lock plate.

6. The linear actuator according to claim 5 further including a left lift pin extending between said front left lock plate and said rear left lock plate, and a right lift pin extending between said front right lock plate and said rear right lock plate, said lift pins acting against said lower planar friction surface of said actuator rod as said lock release shaft is rotated and said upper cam surfaces of said front and rear lift plates contacting the lower edges of said lock plates to positively lift said actuator rod free from said lower clamp member to permit position adjustment of said movable element.

7. The linear actuator according to claim 2, said biasing means further comprising a spring connected between said pairs of lock plates to bias said pair of upper clamp members in contact with said upper planar surface of said actuating rod.

8. The actuator according to claim 6 wherein said upper planar surface of said lower clamp member and said lower planar friction surface of said actuator rod have inter-locking serrations.

9. A linear actuator for use in a position adjusting mechanism for adjusting the position of a movable element relative to a stationary member, comprising:

said movable member including a longitudinally extending actuator rod having a horizontal extending planar friction surface;

a stationary clamp member having a horizontal extending friction surface normally engaging the horizontal extending planar surface of said actuator rod to maintain said actuator rod stationary with respect to said clamp member;

means for moving the horizontally extending planar friction surface of said actuator rod vertically away from the horizontally extending planar surface of said clamp member to permit longitudinal adjustment of said actuator rod relative to said clamp member; and an inertial locking element rotationally mounted relative to one of said actuator rod and clamping member so that when a sudden inertial force is applied to said actuator, said inertial locking element will be rotated to lock against the other of said actuator rod and clamping member to positively prevent any relative movement between said actuator rod and said clamping member.

10. The actuator according to claim 9 wherein said linear actuator has a body portion having an aperture for receiving a mounting fastener for mounting said actuator to said stationary member;

a lock release shaft extending through a central aperture in said stationary clamping member and a cam connected with said lock release shaft for moving said actuator rod vertically away from said clamping member when said lock release shaft is rotated to permit longitudinal adjustment of said actuator rod relative to said clamp member, and said inertial locking element being rotatably mounted on said lock release shaft so that when a sudden inertial force is applied to said actuator, said inertial locking element will be rotated to lock against said actuator rod to positively prevent any relative movement between said actuator rod and said clamping member.

11. The linear actuator according to claim 1, said pivotal mounting means further comprising an main rivet portion pivotally secured through said upper apertures of said lock plates, said upper apertures each being substantially elongated and diagonal in shape and arranged in substantially overlapping fashion.

12. The linear actuator according to claim 11, said biasing means further comprising a coil spring mounted to said lock release shaft and including an extending end in abutting engagement with a tab portion extending from said lower clamp member.

13. The linear actuator according to claim 12, further comprising a first vertically actuable lift member positioned forwardly of said pairs of lock plates and a second vertically actuable lift member positioned rearwardly of said pairs of lock plates, said forward and rearward lift members each further including apertures at upper ends thereof through which is received opposite ends of said main rivet portion, said lift members each further including a slotted portion through which is engaged a keyed portion of said extending lock release shaft, said slotted portions each further including a main vertical portion and a downwardly angled portion which is bounded in part by an angled shoulder.

14. The linear actuator according to claim 13, further comprising a forward rotating cam member and a rearward rotating cam member which are arranged on opposing sides of said lower clamp member, said rotating cam members each further including a keyed aperture portion to which is secured said keyed portion of said extending lock release shaft, said rotating cam members each including a projecting pin portion which is received within said slotted portion of said associated lift member.

15. The linear actuator according to claim 14, further comprising a left lift pin extending between said front left lock plate and said rear left lock plate and a right lift pin extending between said front right lock plate and said rear right lock plate, said left and right lift pins being arranged in a planar and spaced apart distance and being pivotally and upwardly movably secured to said associated lock plates so as to pass underneath said lower planar friction surface of said actuator rod.

16. The linear actuator according to claim 15, further comprising a disk member and a rotating washer portion which are arranged in opposing fashion to a rear face of said rear lift member, a cylindrical rearward tip of said keyed extending portion of said lock release shaft passing through an aperture in said washer and being mounted to said disk member, a lock release handle being mounted to an opposing end of said lock release shaft and being rotated so that said forward and rearward cam members and their associated pins travel along said slotted portions in said forward and rearward lift members, coacting against said angled shoulder portions of said lift members and causing said lift members to actuate upwardly, in turn upwardly and outwardly pivoting said lock plates and causing said left and right lift pins to actuate upwardly and to unseat said lower planar friction surface from said upper planar friction surface of said lower clamp member.

17. A linear actuator for use in a position adjusting mechanism for adjusting the position of a seat back relative to a seat bottom, said linear actuator comprising:

a longitudinally extending actuator rod having a substantially U-shape in cross section with a front side, a rear side and an interconnecting base exhibiting a lower planar friction surface;

an elongate lower clamp member having an upper planar friction surface for locking engagement with said lower planar friction surface of said actuator rod, said lower clamping member having a central aperture for receiving a lock release shaft;

a first pair of generally triangular shaped and parallel spaced lock plates located adjacent to one side of said actuator rod and a second pair of generally triangular shaped and parallel spaced lock plates located adjacent the other side of said actuator rod, said pairs of lock plates being pivotally connected to said lower clamp member at opposed ends of said lower clamp member and extending upwardly and inwardly to overlap each other at a midpoint of said lower clamp member, said pairs of lock plates further being pivotally connected to a main rivet through upper apertures formed in overlapping portions of said lock plates;

a left lift pin extending underneath said lower planar friction surface of said actuator rod at a first location and pivotally and upwardly movably mounted a front left lock plate and a rear left lock plate, a right lift pin extending underneath said lower planar friction surface at a second spaced apart location and pivotally and upwardly movably mounted to a front right lock plate and a rear right lock plate;

a forward rotating cam member and a rearward rotating cam member mounted to said lock release shaft underneath said pairs of lock plates and on opposing sides of said lower clamp member;

a first vertically actuable lift member secured to said lock release shaft forwardly of said forward rotating cam member and a second vertically actuable lift member secured to said lock release shaft rearwardly of said rearward rotating cam member, said forward and rearward lift members further including interior slotted portions defined in part by an engaging shoulder portion and through which is received a pin projecting from said associated cam member, said forward and rearward lift members each further including an upper apertured portion through which is received opposing ends of said main rivet; and a left upper clamp member pivotally secured between said front left lock plate and said rear left lock plate and a right upper clamp member pivotally secured between said front right lock plate and said rear right lock plate, said left and right upper clamp members seating within said U-shaped channel of said actuator rod in a locking position;

wherein, upon rotation of a lock release handle secured to an opposing end of said lock release shaft, said pin members extending from said cam members rotate within the interior slotted portions of their associated lift members, further rotation of said lock release shaft causing said pin members to coact against said engaging shoulder portions, in turn causing said lift members to upwardly actuate, in turn causing said pairs of lock plates to upwardly and outwardly pivot about their connection with said main rivet and said left and right lift pins to elevate upwardly and to unseat said lower planar friction surface of said actuator rod from said upper planar friction surface of said lower clamp member to permit linear adjustment of said actuator rod relative to said seat bottom.

\* \* \* \* \*